United States Patent [19]

Cullinan

[11] 3,966,006

[45] June 29, 1976

[54] DUAL SPRING REAR SUSPENSION FOR MOTORCYCLES

[76] Inventor: John R. Cullinan, 2323 235th Place, Torrance, Calif. 90501

[22] Filed: Oct. 31, 1974

[21] Appl. No.: 519,511

Related U.S. Application Data

[63] Continuation-in-part of Ser. No. 325,725, Jan. 22, 1973, abandoned.

[52] U.S. Cl. .................................. 180/32; 267/57; 267/154; 280/284
[51] Int. Cl.² ................... B62D 61/02; B62K 11/02
[58] Field of Search .............. 280/284, 285; 180/32; 267/57 R, 154

[56] References Cited
UNITED STATES PATENTS

| | | | |
|---|---|---|---|
| 2,705,154 | 3/1955 | Torre | 180/32 X |
| 2,751,217 | 6/1956 | Thompson | 267/57 |
| 2,821,860 | 2/1958 | Huston | 267/57 X |
| 2,942,871 | 6/1960 | Kraus | 267/57 |
| 3,241,620 | 3/1966 | Brudnak | 267/57 X |
| 3,432,158 | 3/1969 | Goodwin | 267/57 |
| 3,616,870 | 11/1971 | Kramer | 180/32 |
| 3,642,083 | 2/1972 | Rodler | 180/32 X |

FOREIGN PATENTS OR APPLICATIONS

872,892  6/1942  France ............................... 280/284

*Primary Examiner*—Philip Goodman

[57] ABSTRACT

A rear suspension for motorcycles which employs primary and secondary torsion springs operating on the rotative axis of the horizontally disposed and rearwardly trailing fork carrying the powered traction wheel. The two springs are of selected resilience and are quickly replaceable without disassembly of the suspension system, and each is adjustable for controlling the normal vehicle height and pitch attitude to be subjected to varying loads. Load application to this rear suspension system is substantially central of the vehicle and with the result that radius of gyration is minimized, unsprung weight is reduced, and with improved dynamics characterized by a spring-stop snubbing action resulting in increased traction and ground engagement capability for superior handling.

6 Claims, 7 Drawing Figures

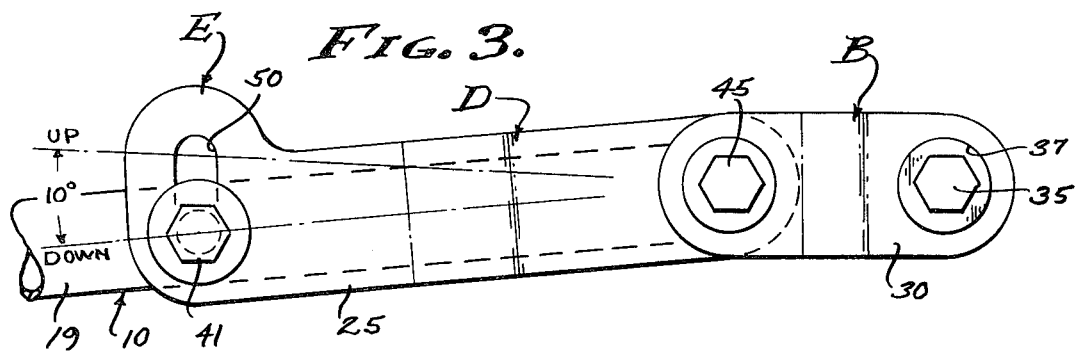
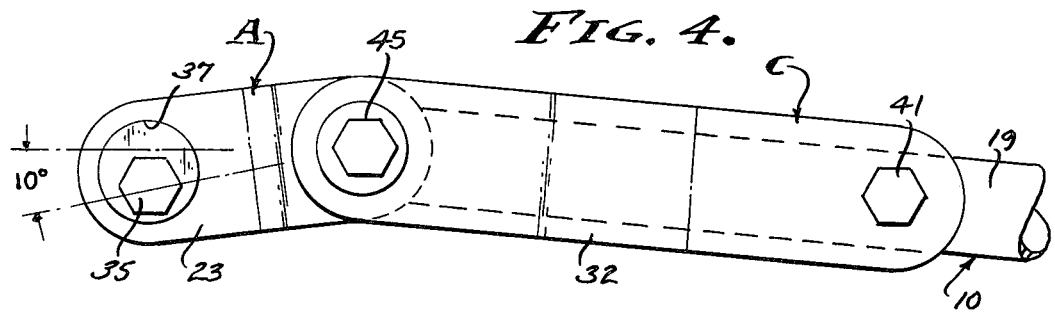
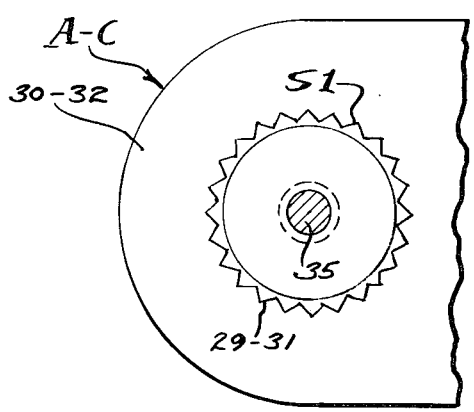
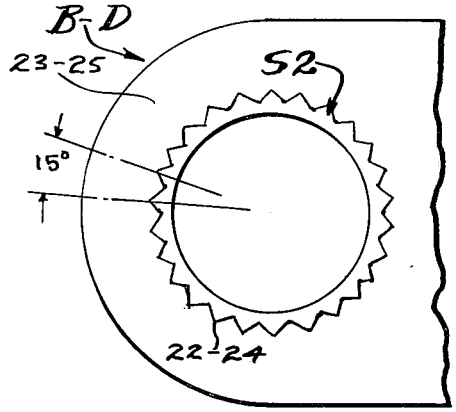
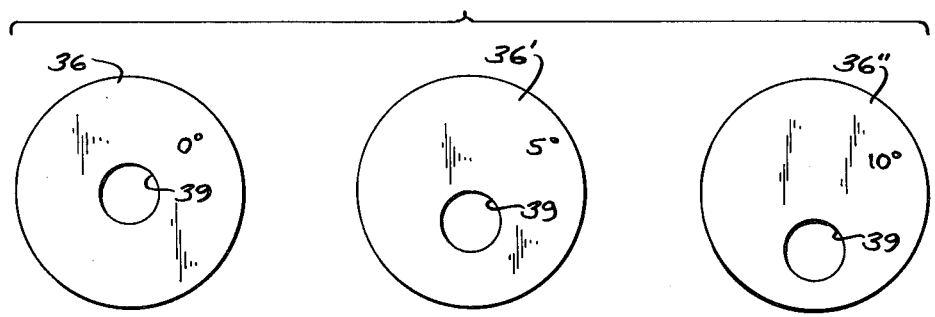

DUAL SPRING REAR SUSPENSION FOR MOTORCYCLES

BACKGROUND:

This is a continuation in part of application Ser. No. 325,725 filed Jan. 22, 1973 and entitled TORSION BAR MOTORCYCLE REAR WHEEL SUSPENSION, now abandoned wherein a single torsion bar provides easily replaceably springing of selective resiliency which is adjustable to exacting requirements.

The undercarriage of motorcycles is the controlling factor which determines handling characteristics of the vehicular machine, and which involves front and rear wheel suspension. The two suspensions include structural systems that permit independent vertical wheel movement relative to the vehicle frame, a spring support between each wheel and the frame, and a shock absorber or damper that impedes relative motion between the suspension structures and the frame. The operational modes of the two suspension systems vary; the front suspension system being characterized by a downwardly and forwardly extending and depressible fork adapted to turn on a caster axis disposed on the central vertical plane of the vehicle; and the rear suspension system being characterized by a substantially horizontal rearwardly extending fork adapted to swing on a transverse horizontally disposed pivotal axis. It is the latter rear suspension system with which the present invention is particularly concerned, it being a general object to provide an improved rear suspension utilizing the torsion spring principle responsive to magnitude of the undercarriage motion to improve the handling and/or traction characteristics according to exacting requirements.

The load distribution to the undercarriage of motorcycles is critical and determines to a great extent the performance to be exacted from the machine. Reference is made to the advantageous use of power which can be supplied in excess by the prime mover as limited by the ability of the vehicular machine to utilize the same. In other words, performance of a motorcycle is not soley reliant upon the power output of the engine, but depends upon the dynamics of the suspension systems while carrying a particular load over varying terrain. There is the unladen weight of the vehicle to be considered and the distribution of the load which results in a laden weight, said load being the shiftable body weight of the person riding the vehicle; and in this respect, it is to be understood that there are various techniques employed by riders in negotiating different terrain and all of which involves the dynamics of the rear wheel suspension where traction is applied through the application of power. It is an object, therefore, to provide a rear suspension system which assures maximum traction by maintaining maximum wheel-to-ground engagement. With the present invention, the effect of a main suspension spring is supplemented by the spring effort of a secondary suspension spring, the main suspension spring being independently operable from a selectively adjustable norm position and through a determined magnitude of motion prior to the pick-up effect of the selectively adjustable secondary suspension spring to snub the motion.

An object of this invention is to provide a rear suspension system of the type thus far referred to wherein the load application thereto is substantially centered with respect to center of gravity of the vehicle, thereby reducing the effective radius of gyration to a minimum. Thus, in place of applying a spring force from a cantilevered frame member, the concept hereinafter disclosed applies the spring force about the rotative axis of the rear suspension fork and which is rotated near the center of the machine. With the present invention, the pitching effect is minimized as a result of the close coupled application of the supporting load near the center of gravity and by the application of a snubbing action afforded by the aforementioned secondary suspension spring.

Another object of this invention is to provide replaceable springs of the type thus far referred to, without disassembly of the rear suspension system, and in such a way that springs of selectively variable resilience are easily installed as circumstances require. Further, it is another object to provide for independent adjustability of the two separately operable suspension springs, main and secondary, to accomodate the riding and/or handling requirements of the rider. This independent adjustability of main and secondary suspension springing determine the pre-load for normal vehicle elevation and determines the pick-up position for snubbing action. With this invention, the main springing action normally subject to overtravel is prevented from doing so by operation of the secondary springing action that is normally free and operational only when a certain predetermined magnitude of suspension motion occurs.

It is still another object of this invention to provide for a fineness of adjustability in setting the rotative positions of the torsion springs, main and secondary, and to provide mountings therefor by which the rear suspension spring support is compact and transfers torsional forces directly into the vehicular frame at or near the center of gravity of said vehicle. With the present invention, mountings are provided at opposite sides of the frame and in the form of embracing bearing housings establishing the pivotal axis for the rear suspension fork and for providing an adjustment means radially offset from said axis; said means being comprised of selective inserts which divide the adjustments established by multi splines that rotatively position the springs, as will be described. The selected springs are quickly installed and adjustable as circumstances require.

DRAWINGS:

The various objects and features of this invention will be fully understood from the following detailed description of the typical preferred form and application thereof, throughout which description reference is made to the accompanying drawings, in which.

Figure 2:
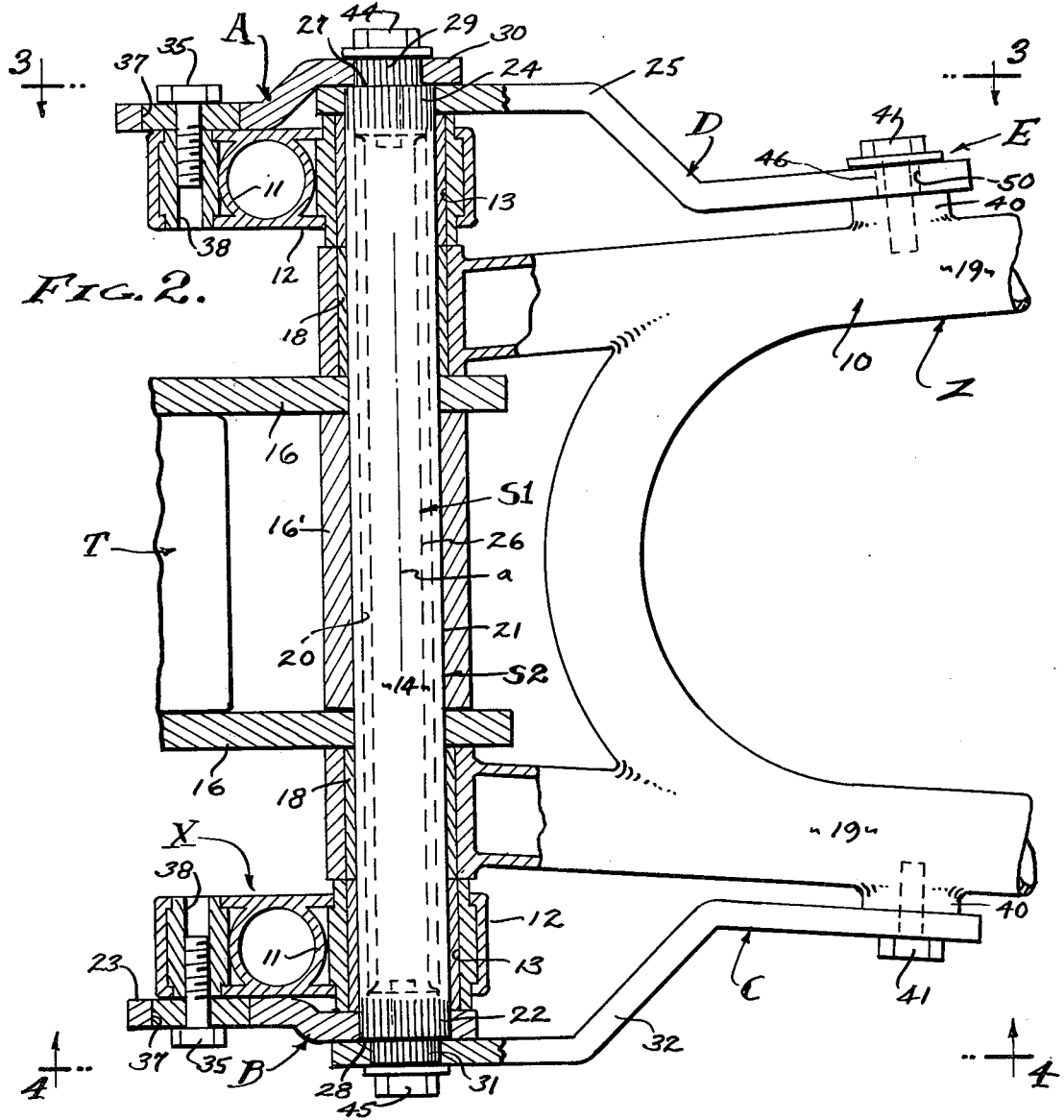
FIG. 2 is an enlarged plan section taken as indicated by line 2—2 on FIG. 1.

FIGS. 3 and 4 are side views taken as indicated by lines 3—3 and 4—4 on FIG. 2.

FIGS. 5 and 6 are end views of the main and secondary torsion bars respectively, shown engaged in the arms into which they are splined.

FIG. 7 is a group view of the adjustment insert that is selected according to the displacement of the opening therethrough.

Figure 1:
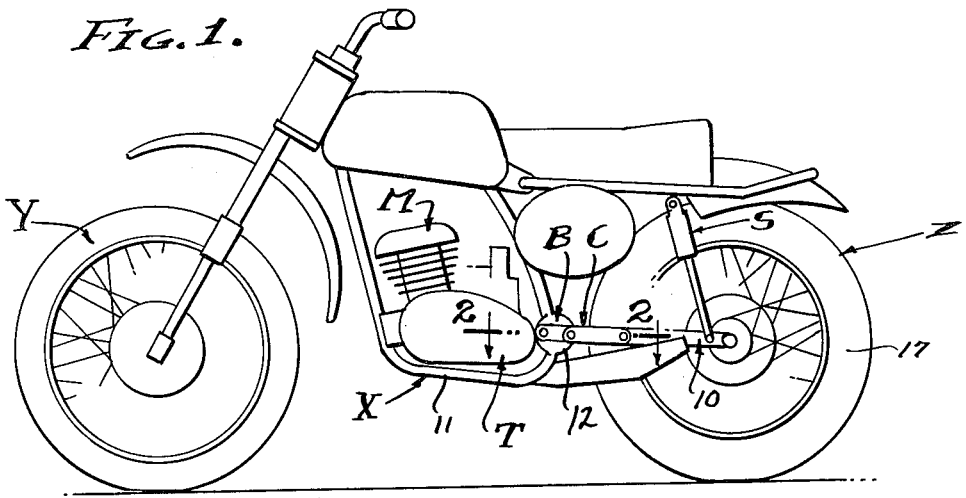
FIG. 1 is a side elevation of a motorcycle embodying the torsion bar rear suspension of the present invention.

PREFERRED EMBODIMENT:

Referring to FIG. 1 of the drawings, a typical motorcycle is illustrated and which involves, generally, a frame X carried by front and rear suspension systems Y and Z. The drawing shows the usual arrangement of motor M and the placement of its accessories, and a typical placement of the saddle for support of the rider who applies a shiftable load which establishes the laden weight and balance of the vehicle. Frames vary widely in construction and there are various ways in which the rear suspension is carried by said frames; and according to current development in the art of motorcycle construction the rear suspension fork 10 is shown pivoted to the frame X on a transverse horizontally disposed axis $a$ disposed in close proximity to the transmission T and drive sprocket axis (not shown). Obviously, the greatest mass of the machine is the motor M and its transmission T which are constructed or joined together as a unit located at or within the area of the overall center of gravity of the vehicle. The frame X has tubular side members 11 to each of which a suspension housing 12 is joined as by welding. The suspension housings 12 are box-like weldments with aligned bores 13 disposed on central axis $a$ on which the rear suspension fork 10 is pivotally carried.

In accordance with this invention, the suspension housings embrace upstanding parallel sections of the spaced tubular side members 11 of the frame X, as best illustrated in FIG. 2. said embracement places the axis $a$ rearward of the members 11 and places anchor means A and B forward of said members 11 respectively. The box-like housings 12 are welded over and/or around the tube members 11 so as to be integral therewith as shown. In carrying out the present invention the usual oppositely projecting suspension spindle is replaced by oppositely projecting torsion springs S1 and/or S2 which comprise the main and the secondary suspension springs, respectively, as will now be described.

This invention involves, generally, coaxial torsion springs S1 and S2, one substantially coextensive with the other and projecting oppositely through the aligned bores 13 of the housings 12. One of the torsion springs, preferably spring S2, is a tubular member through which the other torsion spring operates, each independently of the other and both extending from opposite side housings 12 to be coupled to the anchor means A and B and to the suspension fork 10 by lever means C and D. In accordance with the invention, each torsion spring has a dead end and a live end, in each instance outside the frame structure. As shown, the primary suspension spring S1 is a bar coaxially operable within the secondary suspension spring S2 in the from of a tube that extends oppositely from the housings 12 to provide a spindle 14 that rotatably carries the rear suspension fork 10. One of said means A–D includes lost motion means E, preferably the lever means D as shown.

The suspension fork 10 is of normal construction disposed between the frame member 11 with bushings 18 having anti-friction engagement with the spindle 14 found by the outer diameter 21 of spring S2. The fork 10 has spaced rearwardly extending arms 19, with or without a transverse connecting member as shown, which carry the rear axle assembly and traction wheel 17 of the motorcycle. The bushings 18 of the fork 10 embrace mounting members 16 extended rearwardly from transmission T and between which there is a spacer tube 16'; all of which is assembled as shown in FIG. 2. According to usual practice shock absorbers S extend upwardly between arms 19 and frame X at each side of the vehicle. However, notice that the shock absorbers S are not surrounded by the usual spring supports.

In accordance with the present invention, I provide the dual torsion springs S1 and S2 journaled one within the other to carry and support the suspension fork 10 at an adjusted normal position for motion within a determinable operable range. Referring now to the tubular torsion spring S2, a cylindrical tube of spring metal is provided having inner and outer diameters 20 and 21 and serrated end portions (see FIG. 6) that project oppositely beyond the housing 12 to cooperate with either the means B or means D. Facing forwardly, there is a left hand serrated portion 22 to receive an arm 23 of anchor means B, and there is a right hand serrated portion 24 to receive an arm 25 of lever means D. In practice the arms 23 and 25 have serrated bores slideably engaged with the serrated exterior of portions 22 and 24, and thereby having incrementally positionable driving engagement through the tubular spring S2.

Referring now to the torsion spring S1, a cylindrical bar of spring material is provided having an outer diameter 26 and serrated end portions that project oppositely beyond the normal ends 27 and 28 of the tubular spring member S2 to cooperate with either means A or means C. There is a right hand serrated portion 29 to receive an arm 30 of anchor means A and there is a left hand serrated portion 31 to receive an arm 32 of lever means C. In practice, the arms 30 and 32 have serrated bores slideably engaged with the serrated exteriors of portions 29 and 31, and thereby having incrementally positonable driving engagement through the bar-like spring S1.

The anchor means A and B are alike and are provided to secure the arms 23 and 30 to the housing 12 at the frame side members 11, at points spaced radially from axis $a$ in each instance. As shown, the means A and B each involve fastener means 35, an insert 36 and a receiver 37 for the insert; the anchor means serving to adjustably position the arms 23 and 30, so as to permit alignment of fastener means 35, and to accomodate deflections of the structure without imposing stresses. In practice, the serrations on springs S1 and S2 are necessarily incrementally spaced, for example 15° apart as shown in FIGS. 5 and 6. It is to be understood, however, that finer serrations and closer adjustment positions can be provided for. The adjustability afforded by selective inserts divides said increments by using one of the several inserts 36, 36' or 36", or more as they are illustrated in FIG. 7. In accordance with this invention, the receiver 37 is formed as a circular opening in the arms 23 and 30, substantially concentric with a threaded fastener opening 38 in the housing 12. The inserts are disc-shaped so as to engage snuggly in the receiver 37, there being a centered and two incrementally offset fastener openings 39 therethrough, for example at three eccentric positions which establish 5° incremental adjustment. Thus, any selected splined position established by the serrated springs can be repositioned 5° or 10° upwardly or downwardly as may be desired. FIG. 3 illustrates a 0° or 15° increment positioning using insert 36, while FIG. 4 illustrates a repositioning of 10° using insert 36". The fastener means 35 is a cap screw or the like threaded into the opening 38 and tightened to secure the anchor means A and/or B.

The lever means C and D are alike and are provided to secure the arms 25 and 32 to the side members of suspension fork 10, at a point spaced from axis a in each instance. As shown, the means C and D each involves a mounting comprised of a boss 40 on the outside of fork 10 and a screw fastener 41 or the like to hold the arm to the boss. Retainment of all parts of this suspension system is by means of cap screws 44 and 45 to the normal ends of said spring member S1.

The lost motion means E is preferably incorporated in the lever means D that couples the effect of the secondary torsion spring S2 to the suspension fork 10, as shown in FIG. 3. The screw fastener of means D bears upon a sleeve 46 that operates freely within a slot 50 disposed so as to permit limited angular displacement of the arm relative to the fastener. In practice, a permissible range of angular displacement is 10°, however it is to be understood that this variable can be determined as circumstances require by spring selection and by the provision of stops (not shown).

From the foregoing it will be seen that I have provided an effective combination of parts and elements which can be included in a motorcycle construction or adapted thereto as may be required. The turned intermediate portions of the torsion bar springs S1 and S2 are readily calibrated for predetermined resilience and are easily removed and reinstalled. Removal of the spring bar S2 necessarily removes support of the motorcycle frame X and is effected by removing the screw fasteners and arms at opposite sides of the structure. A feature is that the primary spring S1 is finely adjustable by selection of the inserts of means A so as to adjust and thereby establish the norm from which the suspension motion is initiated; while the secondary spring S2 is independently adjustable by selection of the inserts of means B so as to adjust and thereby establish the pick-up point of the lost motion means E. As a result of the aforementioned selection and adjustment of springs S1 and S2, most suited to a particular person riding the motorcycle involved, fine adjustment as to the effective height of the primary spring can be quickly made and correlated with fine adjustment determing the pick-up point for the secondary spring, and the reduced unspring weight together with the load application on axis a in close proximity to the center of gravity produces improved performance as a result of a more uniform and pronounced increase in wheel-to-ground engagement.

Having described only a typical preferred form and application of my invention, I do not wish to be limited or restricted to the specific details herein set forth, but wish to reserve to myself any modifications or variations that may appear to those skilled in the art.

I claim:

1. An adjustable rear suspension system for a motorcycle having a frame, said system comprising: a bearing means on the rear of said frame on a transverse, horizontally disposed axis; a rearwardly extending, rear wheel mounting fork; means at the forward end of said fork rotatably engaged on said frame about said axis; a torsion spring journaled in said bearing means about said axis, said spring having opposite ends projecting from respective ends of said bearing means; a first lever arm affixed to one of said torsion spring ends; a first connecting means for adjustably connecting said first lever arm to said frame, said first connecting means comprising a receiver in said first lever arm longitudinally spaced from said axis, an insert selectively rotationally mounted in said receiver, an offset opening in said insert, an opening in said frame aligned with said insert opening, and a fastener passing through said openings whereby the selective rotation of said insert about the axis of said offset opening angularly adjusts said first lever arm about said axis; a second lever arm affixed to the other of said torsion spring ends; and a second connecting means longitudinally spaced from said transverse axis, securing said second lever arm to said fork.

2. An adjustable rear suspension system as claimed in claim 1, and further comprising means for selectively adjusting at least one of said lever arms relative to said torsion spring, said selectively adjusting means comprising relatively engaging incrementally spaced serrations formed in said spring and said at least one arm respectively, wherein the spacing between said serrations is such as to provide relatively large adjustment and the offset opening is positioned in said insert such as to provide relative fine adjustment.

3. An adjustable rear suspension system as claimed in claim 1, and further comprising means for selectively adjusting at least one of said lever arms relative to said torsion spring, said selectively adjusting means comprising relatively engaging incrementally spaced serrations formed in said spring and said at least one arm respectively, wherein the spacing between said serrations is such as to provide relatively large adjustment, and a circular receiver opening in said at least one lever arm and a disc-shaped insert therein with an opening therethrough offset eccentrically closer than the spacing of the serrations such as to provide relatively fine adjustment.

4. A dual spring suspension system of a motorcycle undercarriage which includes; a frame having a bearing means on a transverse horizontally disposed axis, a first tubular torsion spring carried through said bearing means on said axis and projecting from the frame with one end connected thereto by a first lever arm, a rearwardly extending fork rotatably engaged at its forward end upon said tubular torsion spring and carrying an axle and wheel assembly at its rear end, the other end of the said tubular spring being connected to the fork by a second lever arm, a second torsion spring journaled within and projecting through the first mentioned tubular torsion spring and with the opposite ends thereof projecting from the first mentioned tubular torsion spring and with one end connected to the frame by a third lever arm and with the other end connected to the fork by a fourth lever arm, means for connecting said lever arms to the frame and fork respectively, and lost motion means forming one of said means for connecting said lever arm for limited freedom thereof.

5. The dual spring motorcycle suspension as claimed in claim 4, wherein the lost motion means forms the means for connecting the said second lever arm to the fork.

6. The dual spring motorcycle suspension as claimed in claim 4, wherein the lost motion means forms the means for connecting the said fourth lever arm to the fork.

* * * * *